May 31, 1966  W. E. VIELSTICH ETAL  3,253,956
FUEL CELL AND ELECTRODES FOR THE PRODUCTION OF ELECTRICAL
ENERGY BY DIRECT REACTION OF GASEOUS
FUELS WITH OXIDIZING GASES
Filed June 14, 1960  2 Sheets-Sheet 1

INVENTORS:
WOLF VIELSTICH, GERHARD GRÜNEBERG, HERBERT SPENGLER

By Burgess, Dinklage & Sprung
ATTORNEYS

May 31, 1966  W. E. VIELSTICH ETAL  3,253,956
FUEL CELL AND ELECTRODES FOR THE PRODUCTION OF ELECTRICAL
ENERGY BY DIRECT REACTION OF GASEOUS
FUELS WITH OXIDIZING GASES
Filed June 14, 1960  2 Sheets-Sheet 2

INVENTORS:
WOLF VIELSTICH, GERHARD GRÜNEBERG, HERBERT SPENGLER

By Burgess, Dinklage & Sprung
ATTORNEYS

United States Patent Office 3,253,956
Patented May 31, 1966

3,253,956
FUEL CELL AND ELECTRODES FOR THE PRODUCTION OF ELECTRICAL ENERGY BY DIRECT REACTION OF GASEOUS FUELS WITH OXIDIZING GASES
Wolf E. Vielstich, Bonn, and Gerhard Grüneberg and Herbert Spengler, both of Oberhausen-Holten, Germany, assignors, by mesne assignments, to Varta Aktiengesellschaft, Frankfurt am Main, and Siemens-Schuckert-Werke Aktiengesellschaft, Erlangen, Germany
Filed June 14, 1960, Ser. No. 36,050
Claims priority, application Germany, June 20, 1959, R 25,778
17 Claims. (Cl. 136—86)

This invention relates to a novel electrode and more particularly to a catalyst sieve electrode, the use of which permits a reduction of the internal resistance and consequently an increase in current density in fuel cells designed for the conversion of the free energy of combustion of fuels into electrical energy by electrochemical reaction and to fuel cells employing the novel electrode structure. Broadly the invention seeks to improve the fuel cells now in use, the electrode structure thereof and the method of energy conversion.

Electrodes consisting of catalytically active or inactive frits and sieves arranged parallel to said frits and provided with means for current supply and having arranged therebetween a granular or pulverulent material having electrical conductivity and catalytic activity have already been proposed for use in fuel cells which are operated with gaseous fuels.

Electrodes of this type are in many instances more advantageously used in the typical electrochemical reactions than are the preformed electrodes, such as, for example, sheet metal, sieves with or without active layers, shaped bodies obtained by pressing and sintering metal powders, activated carbon or mixtures of powders since, due to the loose bed arrangement of the active material, they are less subject to destruction by rupture etc. and, consequently, can be easily produced for larger units. Moreover, the effective surface area of such loose beds is larger than that of preformed porous catalyst electrodes.

In another type of fuel cells used heretofore for the generation of electrical energy by direct reaction of gaseous fuels with oxidizing gases, the electrolyte consists of a membrane of a solid ion exchange material (British Patent 794,471). These cells have been operated up to the time of the present invention with preformed porous catalyst electrodes. This type of fuel cells is hereinafter referred to as membrane cells.

Cells of the membrane type have the disadvantage that they can only be operated with very low current densities which range below 1 ma./cm.$^2$ so that these membrane cells require a large volume per unit of power.

It is therefore an object of the invention to provide a fuel cell of low internal resistance; to provide a fuel cell which is capable of an increase in allowable current density at as small as possible a volume of the cell; to provide new and novel electrode structures for carrying the foregoing and other objects into effect; to provide a catalyst electrode which is more active, insensitive to oxidizing gases and more easily and cheaply prepared; to provide a method of converting the free energy reaction of a gas into electrical energy at an electrically conductive surface by diffusing the said gas through an electrolyte in the form of a membrane consisting of a solid ion exchange material in contiguous relation thereto.

Other objects and many of the attendant advantages of this invention will be readily appreciated as the same becomes better understood by reference to the following detailed description when considered in connection with the accompanying sheets of drawings wherein.

Figure 1:
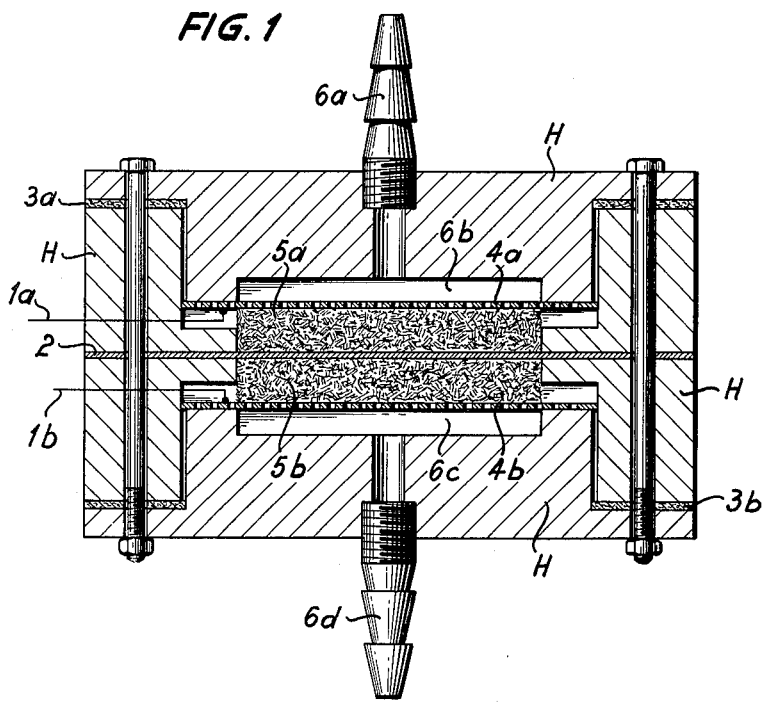
FIG. 1 depicts one embodiment of the fuel cell of the present invention.

In accordance with the invention, the foregoing objects are accomplished by employing catalyst sieve electrodes consisting of beds of loosely arranged catalytically active material in fuel cells wherein the electrolyte is in the form of a membrane consisting of a solid ion exchange material for the direct conversion of chemical energy into electrical energy. The electrode comprises a bed of granular or pulverulent material of uniform thickness having electrical conductivity and catalytic activity and an electrically conducting sieve provided at the side of the catalyst bed opposed to the electrolyte.

Two electrodes in accordance with the invention having the electrolyte membrane arranged therebetween and in contact therewith at their sides opposite the sieve are employed in conjunction with the fuel cell of the invention.

The sieves should be highly permeable. In general, the total open surface area should be from about 5 to 50% and preferably about 20 to 50% of the geometrical electrode surface area. The sieve openings may be of circular, elliptic, polygonal, slotted or other shape. The size of the openings is dependent upon the particle size of the catalyst granules or powder.

In general, the hydraulic diameter of the sieve openings may be from 1 to 200 microns and preferably from 30 to 100 microns.

The sieves used in accordance with the invention may be made of the metal forming the active component in the catalyst as for example of platinum, palladium, nickel, cobalt, iron, silver and copper or of a metal which in the electrochemical series of metals, is a neighboring metal thereto in order to prevent or to minimize the formation of localized cell activity with the catalyst. It is also possible to make the sieve of stainless steel. When an anion exchange material is employed as the electrolyte, the sieve is preferably made of nickel.

The sieves used in accordance with the invention may be made of any of the metals enumerated above and are manufactured preferably by conventional galvanic or mechanical methods.

The ion exchange films serving as electrolyte may be prepared from commercially available ion exchanger materials (see Blasius, Chromatographische Methoden in der analytischen und präparativen anorganischen Chemie, F. Enke Verlag, Stuttgart 1958, page 333, Table 40). They may consist of either cation or anion exchange materials provided that the material selected permits the preparation of electrolyte film complying with the following conditions:

(1) Highest possible ion concentration (>0.1 molar)
(2) High electric conductivity or as low as possible an ohmic resistance (<15 ohms/cm.$^2$) and
(3) As low as possible a gas permeability.

Examples of cation exchanger materials suitable for use in the manufacture of the electrolyte membrane are sulfonated polymers such as, for example, a commercially available sulfonated copolymer of styrene and divinyl benzene.

Examples of suitable catalyst materials include the noble metal catalysts such as, platinum, palladium, rhodium and iridium, and nickel, cobalt, iron, silver and carbon. The particle size of the catalyst may range from 5 to 1000μ, depending on the pore size of the sieves or gauzes. The type of catalyst used is dependent upon whether as electrolyte an anion or cation exchange membrane is used and whether the catalyst bed is arranged on the anode or cathode side.

When the electrolyte is prepared of a cation exchange material, as for example, a sulfonated copolymer of styrene and divinyl benzene then the catalyst bed of the electrode on the fuel gas side preferably consists of activated carbon and preferably contains from 10 to 20% and preferably from 5 to 10% by weight of at least one metal selected from the group consisting of platinum, paladium and iridium. A preferred catalyst bed in this respect is made of carbon and platinum. As an alternative, the above-mentioned metals platinum and/or palladium and/or iridium may be used alone that is without any active carbon being present. For this purpose, the metals are brought into a highly disperse form in the conventional manner.

The catalyst bed of the electrode for the oxidizing gas may consist of the same material used on the fuel gas side. Preferably, it is also made of activated carbon which, may and preferably contains from 1 to 20% and preferably from 5 to 10% by weight of silver, or it is made solely of silver in a highly disperse form.

When the electrolyte is prepared of an anion exchange material as for example of a chloromethylated copolymer of styrene and divinyl benzene, the bed on the fuel gas side preferably consists of Raney nickel or double skeleton-Raney nickel or pulverized carbon which, may and preferably contains from 1 to 20% by weight and preferably from 5 to 10% by weight of at least one of the metals selected from the group consisting of platinum, paladium and iridium.

The catalyst bed of electrode for the oxidizing gas preferably consists of powdered silver, Raney silver or double skeleton Raney silver or of activated carbon which may and preferably contains from 1 to 20% by weight and preferably from 5 to 10% by weight of silver.

As is known, the internal resistance of devices for the electrochemical conversion of liquid materials can be reduced by using double skeleton catalyst electrodes.

Double skeleton material is known per se. It comprises a coarse skeleton of a metal or a semi-conductor having embedded, i.e., incorporated in its pores a fine skeleton in the form of Raney metal. The double skeleton material is prepared by mixing the metal of the carrier skeleton in powder form and a Raney alloy; compression-molding the mixture to form molded bodies; simultaneously or subsequently sintering the molded part by heating, and subsequently bleaching the alloying element out of the Raney alloy by means of a caustic solution or acid. To obtain the double skeleton catalyst in powder form, a molded part of the above-mentioned material is crushed after leaching, or a molded and sintered body is crushed and thereafter the alloying element is leached out by means of an alkaline solution or an acid.

A further advantage of these electrode bodes assembled in accordance with the invention lies in the fact that the individual members can be varied depending upon the requirements to be met by the electrode, and furthermore that exhausted electrodes can be rapidly prepared for re-use by removing and regenerating the catalyst. The electrodes in accordance with the invention are rapidly and cheaply manufactured and, due to their construction, are of higher mechanical strength than the rigid electrode bodies heretofore used, which become useless on the whole when they have been partially damaged. The high degree of adaptability of the catalyst sieve electrode is also of advantage if new catalytic materials are to be tested for applicability in approved devices, since the tedious processes of production, which were heretofore unavoidable in the case of compact electrodes, need not be used. The life of the sieves is practically unlimited. Therefore, it is only necessary to refill the sieves with the regenerated catalyst to obtain once again a fully operable electrode. In contrast to this, double skeleton catalyst electrodes are very brittle and must be discarded in total when mechanically damaged.

The ion exchanger membrane used as electrolyte are impregnated with an acid or caustic solution prior to being used in the fuel cell. The granular catalyst is also advantageously moistened with a solution which, with respect to its pH, is the same as that used for the pretreatment of the membrane, in order to improve the conduction between the granules.

The fuels that may be variously employed in conjunction with the fuel cell of the invention are in gaseous state. As an oxidizing gas there may be used either chlorine, pure oxygen or oxygen mixed with other elements or compounds such as air, for example of the gaseous fuels that may be employed, hydrogen, carbon monoxide, methane, ethane, propane, butane, iso-butane, water gas, producer gas, illuminating gas and natural gas may be taken as illustrative. A particularly suitable fuel for the cell is hydrogen or carbon monoxide while oxygen or air are preferably used as the oxidizing gas.

Referring to the drawings, in the construction of a fuel cell in accordance with the invention as shown in FIG. 1, the membrane 2 is arranged in a holder, the various parts of which are designated as H and in which hollow spaces $6b$ and $6c$ are provided for the gas supply. The gas is supplied to the hollow spaces $6b$ and $6c$ by gas inlet lines $6a$ and $6d$. Gas tight connection of the parts of the holder is ensured by the gasket rings $3a$ and $3b$. Adjacent and in abutting contact with the membrane 2 are the catalyst beds $5a$ and $5b$ which are maintained in their position by sieves or frits $4a$ and $4b$. The sieves or frits are connected with the current leads $1a$ and $1b$ and separate the catalyst bed from a gas space of any shape.

Thus, each electrode of the fuel cell consists of a catalyst bed and a member adjoining it, i.e., the sieve or frit which is embedded in the holder.

Figure 2:
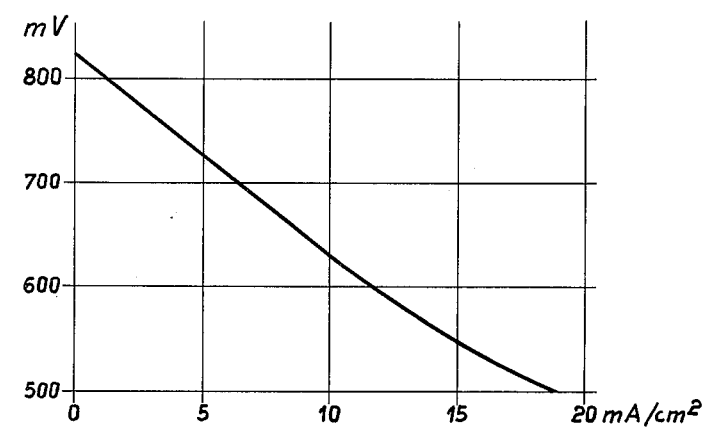
FIG. 2 is a graph showing the current voltage characteristic of an oxyhydrogen cell, the electrolyte of which is a film of a sulfonated copolymer of styrene and divinyl benzene.

FIG. 2 shows a current voltage characteristic of an oxyhydrogen cell provided with as electrolyte a film of a cation exchanger material namely sulfonated copolymer of styrene and divinyl benzene having a resistance of 4 ohms/cm.$^2$. The catalyst of the oxygen electrode utilized in such cell consists of a bed of platinized carbon in the form of electrode carbon containing about 10% by weight of Pt.

The catalyst of the fuel electrode consisted of the exact same material as the oxygen electrode. The catalyst material was confined by grids of stainless steel wire gauze. The membrane surface area in actual contact with the catalytic material was 7 cm.$^2$ on either side. The hydrogen and oxygen pressures were 0.4 kgs./cm.$^2$ gauge and the operating temperature was about 20° C. The voltage of the cell was 0.8 v. under no-load conditions. When drawing 10 ma./cm.$^2$ from the cell, its output was about 0.65 v. In continuous service, 2 to 3 ma./cm.$^2$ could be drawn for an extended period of time.

Figure 3:
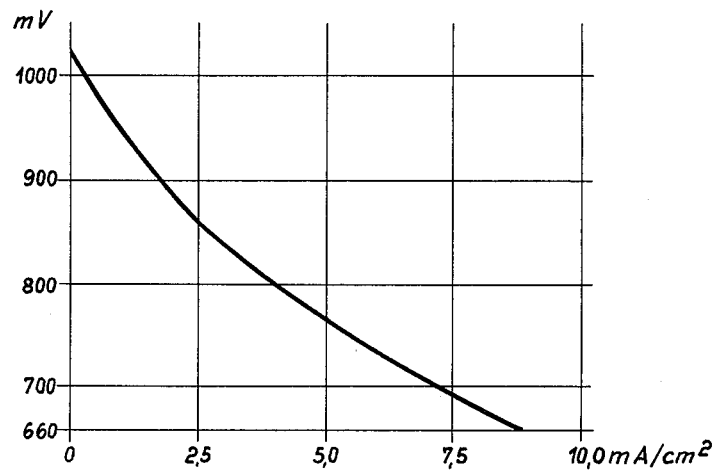
FIG. 3 is a graph showing the current voltage characteristic of an oxyhydrogen cell the electrolyte of which comprises a film of an anion exchange resin.

FIG. 3 shows a current voltage characteristic of an oxyhydrogen cell provided with an anion exchange resin membrane as electrolyte having a resistance of 7 ohms/cm.$^2$. The catalytic material for the fuel electrode was Raney nickel of 50 to 100 microns particle size and the material for the oxygen electrode was reduced $Ag_2O$. The membrane surface area contacted by the catalyst material was 12.5 cm.$^2$ on either side. The hydrogen pressure was 0.1 kg./cm.$^2$ gauge, the oxygen pressure 0.3 kg./cm.$^2$ gauge and the operating temperature was about 20° C. This cell had a static voltage of 1 v. and an output of about 0.65 v. when loaded with 10 ma./cm.$^2$. When drawing current for an extended period of time, the voltage dropped. However, the current intensity could be maintained at a constant value of 2 ma./cm.$^2$ in continuous operation.

Figure 4:
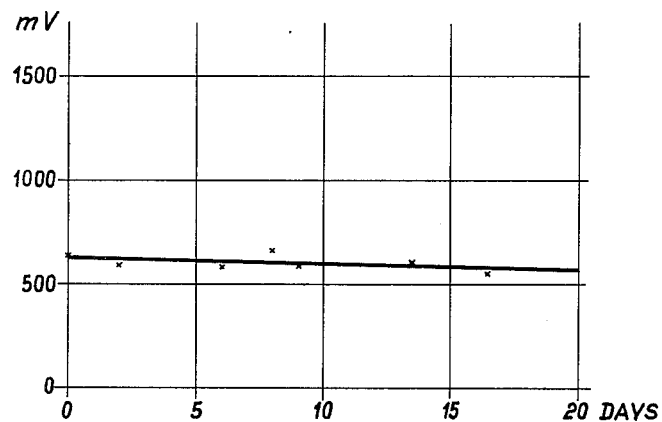
FIG. 4 is a graph showing the voltage as a function of time of a fuel cell in accordance with the invention.

A voltage vs. time curve representing the values obtained in testing a cell in accordance with the invention is shown in FIG. 4. As may be seen from this curve, the voltage remains substantially constant even when operating the cell for weeks. The electrolyte of this cell consisted of a membrane having a resistance of 20 to 25 ohms/cm.$^2$. The catalyst of the fuel gas electrode was Raney nickel that of the electrode for the oxidizing gas was reduced $Ag_2O$. The temperature was 20° C., the $H_2$ pressure 0.4 kgs./cm.$^2$ gauge and the $O_2$ pressure 0.6 kgs./cm.$^2$ gauge.

The invention may be further illustrated by the following example set forth by way of illustration and not limitation.

*Example*

In a fuel cell, an anion exchange membrane of Nepton AR 111 of a thickness of 0.6 mm. impregnated with 27% KOH-solution, was arranged between a layer of double skeleton nickel granules as electrode for the fuel gas, consisting of $H_2$ and a layer of activated carbon granules, provided with reduced $Ag_2O$ in an amount of 20% by weight silver, as electrode for the oxidizing gas. The layers had a thickness of 1.5 mm. each, their diameters as well as the diameter of the said membrane amounted to 12.5 cm.$^2$, the particle size of the double-skeleton-nickel granules amounted to 20–60$\mu$, that of the carbon granules to 20–60$\mu$. On the fuel gas side there was arranged a stainless steel sieve, the openings of which had a hydraulic diameter of 10$\mu$, on the side of the oxidizing gas there was arranged a silver gauze with openings of 10$\mu$ hydraulic diameter. The fuel gas electrode was supplied with $H_2$ under a pressure of 0.15 kg./cm.$^2$ gauge, the electrode for the oxidizing gas was in contact with $O_2$ under a pressure of 0.15 kg./cm.$^2$ gauge. The double skeleton nickel granules as well as the carbon granules were moistened with the solution, used for impregnating the membrane. The cell was operated at room temperature for months. During this time, the cell voltage remained constant at 0.75–0.77 v. when loaded with 12 ma./cm.$^2$.

We claim:

1. In a fuel cell for the electrochemical conversion of gaseous materials in the presence of two catalyst electrodes separated by a solid electrolyte in the form of a membrane, the improvement which comprises providing as the electrodes therefor catalyst sieve electrodes, each of said electrodes comprising (1) a bed of loosely arranged granular divided catalytically active material said beds being of uniform thickness, one side of each of said beds being in contact with one side of a membrane comprising a solid ion exchange material and (2) an electrically conducting sieve provided with current supply means at the side of each of said catalyst beds opposite said membrane, said side constituting the gas side of said catalyst bed.

2. A fuel cell according to claim 1 wherein the hydraulic diameter of the sieve opening is from 30 to 100 microns.

3. A fuel cell according to claim 1 wherein said electrolyte is a cation exchange material.

4. A fuel cell according to claim 1 wherein said electrolyte is an anion exchange material.

5. A fuel cell according to claim 1 wherein said electrolyte is a cation exchange material and wherein one of said electrodes and namely the electrode for the fuel gas consists of activated carbon and from 1 to 20% by weight of at least one member selected from the group consisting of platinum, palladium and iridium.

6. A fuel cell according to claim 1 wherein said electrolyte is a cation exchange material and wherein one of said electrodes and namely the electrode for the fuel gas consists of activated carbon and from 5 to 10% by weight of at least one member selected from the group consisting of platinum, palladium, and iridium.

7. A fuel cell according to claim 1 wherein said electrolyte is a cation exchange material and wherein one of said electrodes and namely the electrode for the oxidizing gas consists of activated carbon.

8. A fuel cell according to claim 1 wherein said electrolyte is a cation exchange material and wherein one of said electrodes and namely the electrode for the oxidizing gas consists of activated carbon and from 1 to 20% by weight of at least one member selected from the group consisting of platinum, palladium and iridium.

9. A fuel cell according to claim 1 wherein said electrolyte is a cation exchange material and wherein one of said electrodes and namely the electrode for the oxidizing gas consists of activated carbon and from 5 to 10% by weight of at least one member selected from the group consisting of platinum, palladium, and iridium.

10. A fuel cell according to claim 1 wherein said electrolyte is a cation exchange material and wherein one of said electrodes and namely the electrode for the oxidizing gas consists of activated carbon and from 1 to 20% by weight of silver.

11. A fuel cell according to claim 1 wherein said electrolyte is a cation exchange material and wherein one of said electrodes and namely the electrode for the oxidizing gas consists of activated carbon and from 5 to 10% of silver.

12. A fuel cell according to claim 1 wherein said electrolyte is an anion exchange material and wherein one of said electrodes and namely the electrode for fuel gas consists of activated carbon and from 1 to 20% by weight of at least one member selected from the group consisting of platinum, palladium and iridium.

13. A fuel cell according to claim 1 wherein said electrolyte is an anion exchange material and wherein one of said electrodes and namely the electrode for the fuel gas consists of activated carbon and from 5 to 10% by weight of at least one member selected from the group consisting of platinum, palladium and iridium.

14. A fuel cell according to claim 1 wherein said electrolyte is an anion exchange material and wherein one of said electrodes and namely the electrode for the oxidizing gas consists of activated carbon and from 1 to 20% by weight of silver.

15. A fuel cell according to claim 1 wherein said electrolyte is an anion exchange material and wherein one of said electrodes and namely the electrode for the oxidizing gas consists of activated carbon and from 5 to 10% by weight of silver.

16. A fuel cell according to claim 1 wherein said electrolyte consists of a sulfonated copolymer of styrene and divinyl benzene.

17. A fuel cell according to claim 1 wherein said electrolyte consists of a chloromethylated copolymer of styrene and divinyl benzene.

References Cited by the Examiner

UNITED STATES PATENTS

| | | | |
|---|---|---|---|
| 1,182,759 | 5/1916 | Emanuel | 136—86 |
| 2,913,511 | 11/1959 | Grubb | 136—86 |
| 2,947,797 | 8/1960 | Justi et al. | 136—86 |

WINSTON A. DOUGLAS, *Primary Examiner.*

JOHN R. SPECK, JOHN H. MACK, *Examiners.*